United States Patent
Lin et al.

(10) Patent No.: US 9,078,303 B2
(45) Date of Patent: Jul. 7, 2015

(54) LIGHT EMITTING DIODE DRIVING CIRCUIT AND DRIVING METHOD THEREOF

(71) Applicant: AU OPTRONICS CORP., Hsin-Chu (TW)

(72) Inventors: Chun-Hsien Lin, Hsin-Chu (TW); Chin-Shun Chen, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 213 days.

(21) Appl. No.: 13/729,169

(22) Filed: Dec. 28, 2012

(65) Prior Publication Data

US 2013/0334976 A1   Dec. 19, 2013

(30) Foreign Application Priority Data

Jun. 13, 2012   (TW) .............................. 101121178 A

(51) Int. Cl.
  *H05B 37/02*   (2006.01)
  *H05B 33/08*   (2006.01)

(52) U.S. Cl.
  CPC ............ *H05B 37/02* (2013.01); *H05B 33/0815* (2013.01); *H05B 33/0824* (2013.01); *Y02B 20/346* (2013.01)

(58) Field of Classification Search
  CPC .. H05B 33/0815; H05B 37/029; H05B 37/02; H05B 33/0803; B60Q 1/387; Y02B 20/346; Y02B 20/347
  USPC ............. 315/185 R, 210, 247, 291, 294, 297, 315/307, 312, 320; 345/82, 102
  See application file for complete search history.

(56) References Cited

U.S. PATENT DOCUMENTS

| | | | |
|---|---|---|---|
| 6,697,402 B2 | 2/2004 | Crawford | |
| 7,425,943 B2 * | 9/2008 | Furukawa | ..................... 345/102 |
| 7,564,434 B2 | 7/2009 | Kim | |
| 8,525,422 B2 * | 9/2013 | Lin et al. | .................. 315/185 R |
| 8,917,035 B2 * | 12/2014 | Zhang et al. | .................. 315/307 |

(Continued)

FOREIGN PATENT DOCUMENTS

| | | |
|---|---|---|
| TW | I236165 | 7/2005 |
| TW | I265465 | 11/2006 |

(Continued)

OTHER PUBLICATIONS

Taiwan Intellectual Property Office, "Office Action", May 26, 2014.

*Primary Examiner* — Haiss Philogene
(74) *Attorney, Agent, or Firm* — WPAT, PC; Justin King

(57) ABSTRACT

A LED string driving circuit includes a plurality of LED strings; a power supply unit configured to receive an input voltage and accordingly output a driving voltage to the LED strings; a comparison unit configured to receive the input voltage and output a first control signal according to a relationship between the input voltage and a predetermined voltage; a control unit configured to receive the first control signal and generate a second control signal according to a potential level of the first control signal; and a switch unit including a plurality of switch elements, and each are controlled by the second control signal and thereby forming various electrical loops and thereby configuring the LED strings corporately to form either a parallel loop or a series loop via the switch unit with respective electrical loops. A LED string driving method is also provided.

9 Claims, 5 Drawing Sheets

(56) References Cited

U.S. PATENT DOCUMENTS

2010/0026208 A1  2/2010  Shteynberg et al.
2012/0161648 A1  6/2012  Lin et al.

FOREIGN PATENT DOCUMENTS

| TW | M412313 | 9/2011 |
| TW | 201220924 A | 5/2012 |

* cited by examiner

LIGHT EMITTING DIODE DRIVING CIRCUIT AND DRIVING METHOD THEREOF

TECHNICAL FIELD

The present disclosure relates to a driving circuit and a driving method thereof, and more particularly to a light emitting diode (LED) string driving circuit and a driving method thereof.

BACKGROUND

Light emitting diode (LED), a common light emitting semiconductor electronic component created in the 1960s, now is developed to be able to emit the visible, infrared and ultraviolet light with certain luminosity. Thus, LEDs are widely used in the indicator, display panel and backlight module of display. Specifically, LEDs are also used for lighting with the development of white LEDs.

The driving circuit of today's LEDs usually uses the booster circuit to boost the input voltage so as to provide the voltage required for the driving of the LEDs. However, the dropping input voltage may lead to an increasing boost ratio as well as poor power conversion efficiency. With a high demand of lower power consumption, it is important to develop a more efficient driving circuit of LEDs.

SUMMARY

One object of the present disclosure is to provide a LED string driving circuit and a driving method thereof capable of correspondingly modulate the connection configuration of a plurality of LED strings in response to a variation of an input voltage, and thereby improving power conversion efficiency consequently.

The disclosure provides a LED string driving circuit, which includes a plurality of LED strings, a power supply unit, a comparison unit, a control unit and a switch unit. The power supply unit is electrically coupled to the LED strings and configured to receive an input voltage and accordingly output a driving voltage to the LED strings. The comparison unit is configured to receive the input voltage and output a first control signal according to a relationship between the input voltage and a predetermined voltage. The control unit is electrically coupled to the comparison unit and configured to receive the first control signal and generate a second control signal according to a potential level of the first control signal. The switch unit is electrically coupled to the control unit, the power supply unit and the LED strings. The switch unit includes a plurality of switch elements; and the switch elements each are controlled by the second control signal and thereby forming various electrical loops. Specifically, when the switch unit has one specific electrical loop and thereby configuring the LED strings corporately to form a parallel loop, the LED strings in the parallel loop are driven and controlled by the driving voltage. Alternatively, when the switch unit has another specific electrical loop and thereby configuring the LED strings corporately to form a series loop, the LED strings in the series loop are driven and controlled by the driving voltage.

The disclosure further provides a LED string driving method applicable to drive a driving circuit. The driving circuit includes a plurality of LED strings, a power supply unit electrically coupled to the LED strings, a comparison unit configured to receive an input voltage, a control unit electrically coupled to the comparison unit and a switch unit electrically coupled to the control unit, the power supply unit and the LED strings. The driving method includes: configuring the comparison unit to output a first control signal to the control unit through comparing the input voltage to the predetermined voltage; configuring the control unit to output a second control signal to the switch unit according to the first control signal; and configuring the switch unit to form various electrical loops and configuring the LED strings to corporately form either a parallel loop or a series loop via the switch unit with respective electrical loops.

In summary, through dynamically modulating the connection configuration of a plurality of LED strings in response to the variation of an input voltage relative to a determined voltage Vd, the LED string driving circuit and a driving method thereof of the present disclosure can have improved power conversion efficiency.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
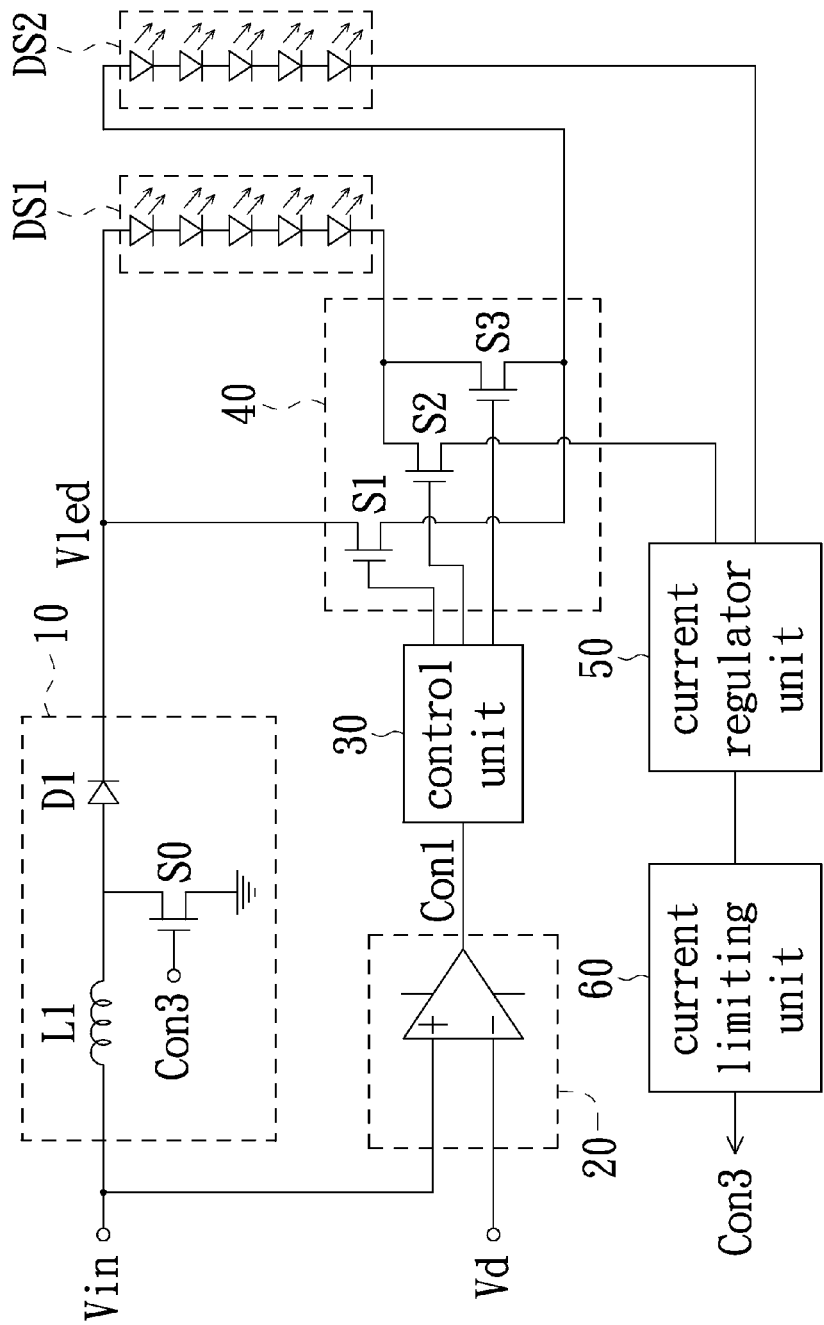
FIG. 1 is a schematic circuit block view of a LED string driving circuit in accordance with an embodiment of the present disclosure.

FIG. 1 is a schematic circuit block view of a light emitting diode (LED) string driving circuit in accordance with an embodiment of the present disclosure. As shown, the LED string driving circuit in this embodiment includes a power supply unit 10, a comparison unit 20, a control unit 30, a switch unit 40 and two LED strings DS1, DS2; wherein the LED strings DS1, DS2 each are constituted by a plurality of LEDs.

The power supply unit 10, electrically coupled to the LED strings DS1, DS2, is configured to receive an input voltage Vin, perform a potential conversion on the received input voltage Vin and accordingly output a driving voltage Vled to the LED strings DS1, DS2. The power supply unit 10 is, for example, realized by a boost converter circuit; and the present disclosure is not limited thereto.

As illustrated in FIG. 1, the power supply unit 10 includes an inductor L1, a diode D1 and a switch element S0. The inductor L1 has a first terminal (not labeled) and a second terminal (not labeled). Specifically, the inductor L1 is configured to have the first terminal thereof for receiving the input voltage Vin. The diode D1 has a first terminal (not labeled) and a second terminal (not labeled). Specifically, the diode D1 is configured to have the first terminal (e.g., the positive terminal) thereof electrically coupled to the second terminal of the inductor L1; and the second terminal (e.g., the negative terminal) thereof electrically coupled to the switch unit 40 and the positive terminal of the LED string DS1. The switch element S0 is, for example, realized by a field effect transistors or a bipolar transistor, and preferably is realized by an N-type thin film transistor; and the present disclosure is not limited thereto. The switch element S0 has a first terminal (e.g., a drain terminal), a control terminal (e.g., a gate terminal) and a second terminal (e.g., a source terminal). Specifically, the switch element S0 is configured to have the first terminal thereof electrically coupled to the first terminal of the diode D1; the control terminal thereof for receiving a third control signal Con3; and the second terminal thereof electrically coupled to ground.

The comparison unit 20 has a first input terminal (e.g., the positive terminal +), a second input terminal (e.g., the negative terminal −) and an output terminal (not labeled). Specifically, the comparing unit 20 is configured to have the first input terminal thereof for receiving the input voltage Vin; the second input terminal thereof for receiving a predetermined voltage Vd; and the output terminal thereof for outputting a first control signal Con1 according to a relationship between the potential values of the input voltage Vin and the predetermined voltage Vd. For example, the comparison unit 20 outputs a logic-high first control signal Con1 if the input voltage Vin has a potential value greater than that of the predetermined voltage Vd; alternatively, the comparison unit 20 outputs a logic-low first control signal Con1 if the input voltage Vin has a potential value smaller than that of the predetermined voltage Vd.

The control unit 30, electrically coupled to the output terminal of the comparison unit 20, is configured to receive the first control signal CON1 from the comparison unit 20 and generate a second control signal based on the potential level of the first control signal Con1. The control unit 30 can be realized by an integrated circuit or a logic circuit such as an application-specific integrated circuit (ASIC), field-programmable gate array (FPGA) and microcontroller (MCU).

As illustrated in FIG. 1, the switch unit 40 is electrically coupled to the control unit 30, the power supply unit 10 and the LED strings DS1, DS2. The switch unit 40 includes three switch elements S1, S2 and S3 each configured to be enable/disable by the second control signal and thereby forming specific electrical loops based on the configuration of the switch elements S1, S2 and S3.

The switch elements S1, S2 and S3 each are, for example, realized by a field effect transistors or a bipolar transistor, and preferably is realized by an N-type thin film transistor; and the present disclosure is not limited thereto. The switch elements S1, S2 and S3 each have a first terminal (e.g., a drain terminal), a control terminal (e.g., a gate terminal) and a second terminal (e.g., a source terminal). Specifically, the switch element S1 is configured to have the first terminal thereof electrically coupled to the second terminal of the diode D1 and the positive terminal of the LED string DS1; the control terminal thereof electrically coupled to a first output terminal (not labeled) of the control unit 30; and the second terminal thereof electrically coupled to the second terminal of the switch element S3 and the positive terminal of the LED string DS2.

Likewise, the switch element S2 is configured to have the first terminal thereof electrically coupled to the first terminal of the switch element S3 and the negative terminal of the LED string DS1; the control terminal thereof electrically coupled to a second output terminal (not labeled) of the control unit 30; and the second terminal thereof electrically coupled to a current regulator unit 50. The switch element S3 is configured to have the first terminal thereof electrically coupled to the first terminal of the switch element S2 and the negative terminal of the LED string DS1; the control terminal thereof electrically coupled to a third output terminal (not labeled) of the control unit 30; and the second terminal thereof electrically coupled to the second terminal of the switch element S1 and the positive terminal of the LED string DS2. Moreover, in this embodiment of the present invention, the number of the switch elements (such as switch elements S1, S2 and S3) in the switch unit 40 and the circuit configuration thereof is based on the number of the LED strings (for example, the LED strings DS1, DS2); and the present disclosure is not limited thereto.

In another circuit configuration, it is to be noted that the LED string driving circuit may further include the current regulator unit 50 and a current limiting unit 60, as illustrated in FIG. 1. The current regulator unit 50, electrically coupled to the switch unit 40 and the LED stings DS1, DS2, is configured to maintain the current flowing through the LED strings DS1, DS2 to a specific fixed value. The current limiting unit 60, electrically coupled to the current regulator unit 50 and the switch element S0, is configured to prevent the current flowing through the LED stings DS1, DS2 from exceeding a critical value. Specifically, the current limiting unit 60 outputs the third control signal Con3 to the control terminal of the switch element S0 terminal if the current flowing through the LED strings DS1, DS2 has a value higher than the critical value.

Figure 2A:
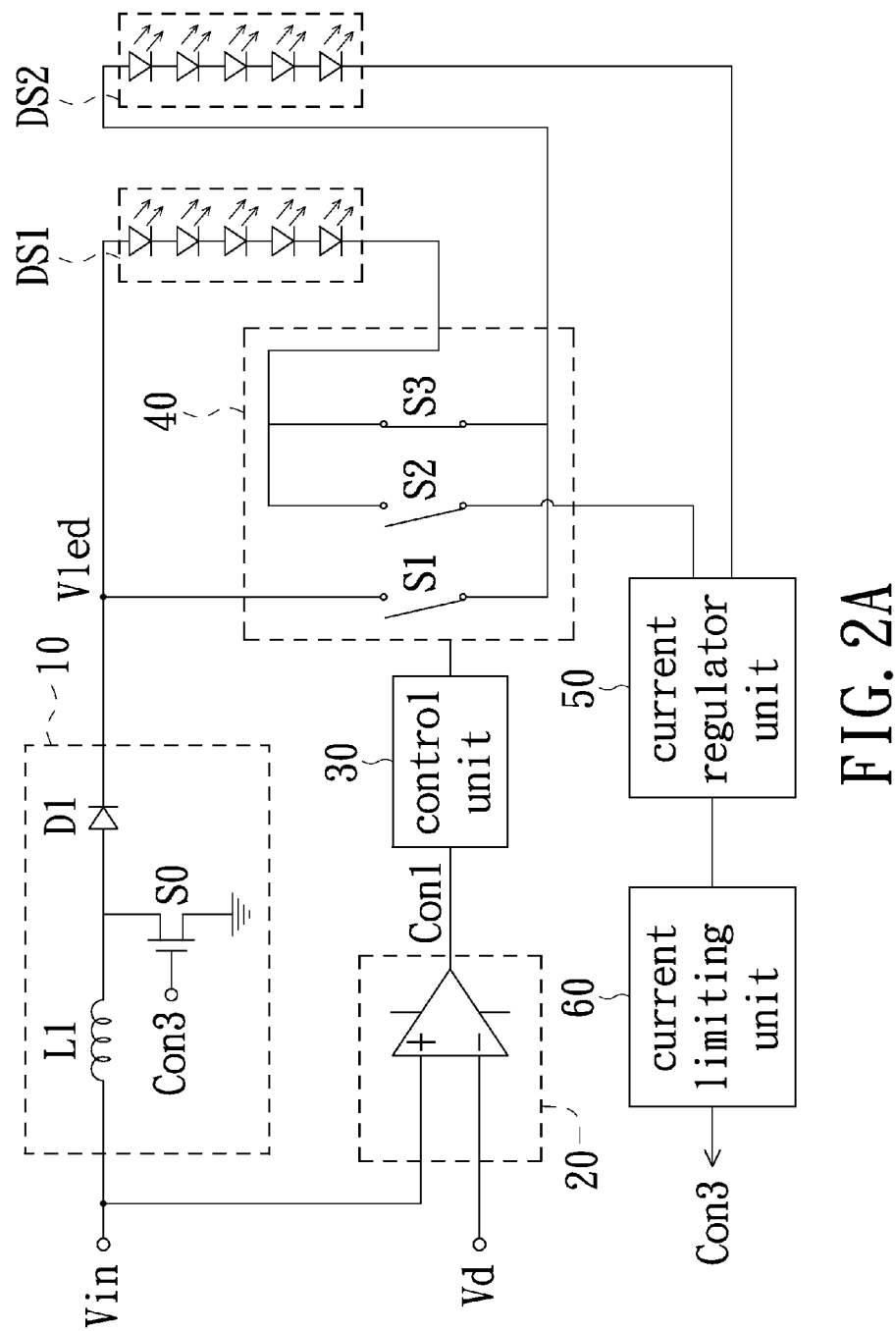
FIG. 2A is a schematic circuit view illustrating one exemplary operation of the switch unit shown in FIG. 1.

FIG. 2A is a schematic circuit view illustrating one exemplary operation of the switch unit 40 shown in FIG. 1. As shown, the comparison unit 20 outputs the first control signal Con1 with a specific logic level according to a relationship between the input voltage Vin and the predetermined voltage Vd. For example, the comparison unit 20 outputs a logic-high first control signal Con1 to the control unit 30 if the input voltage Vin has a potential value greater than that of the predetermined voltage Vd. Afterward, the control unit 30, according to the logic-high first control signal Con1, outputs a plurality of second control signals to the switch unit 40 and thereby turning off the switch elements S1, S2 and turning on the switch element S3.

Therefore, through configuring the negative terminal of the LED string DS1 electrically coupled to the positive terminal of the LED string DS2 via the turned-on switch element S3, accordingly a series loop is formed. In other words, the LED strings DS1, DS2 and the switch unit 40 herein corporately form a series loop.

Figure 2B:
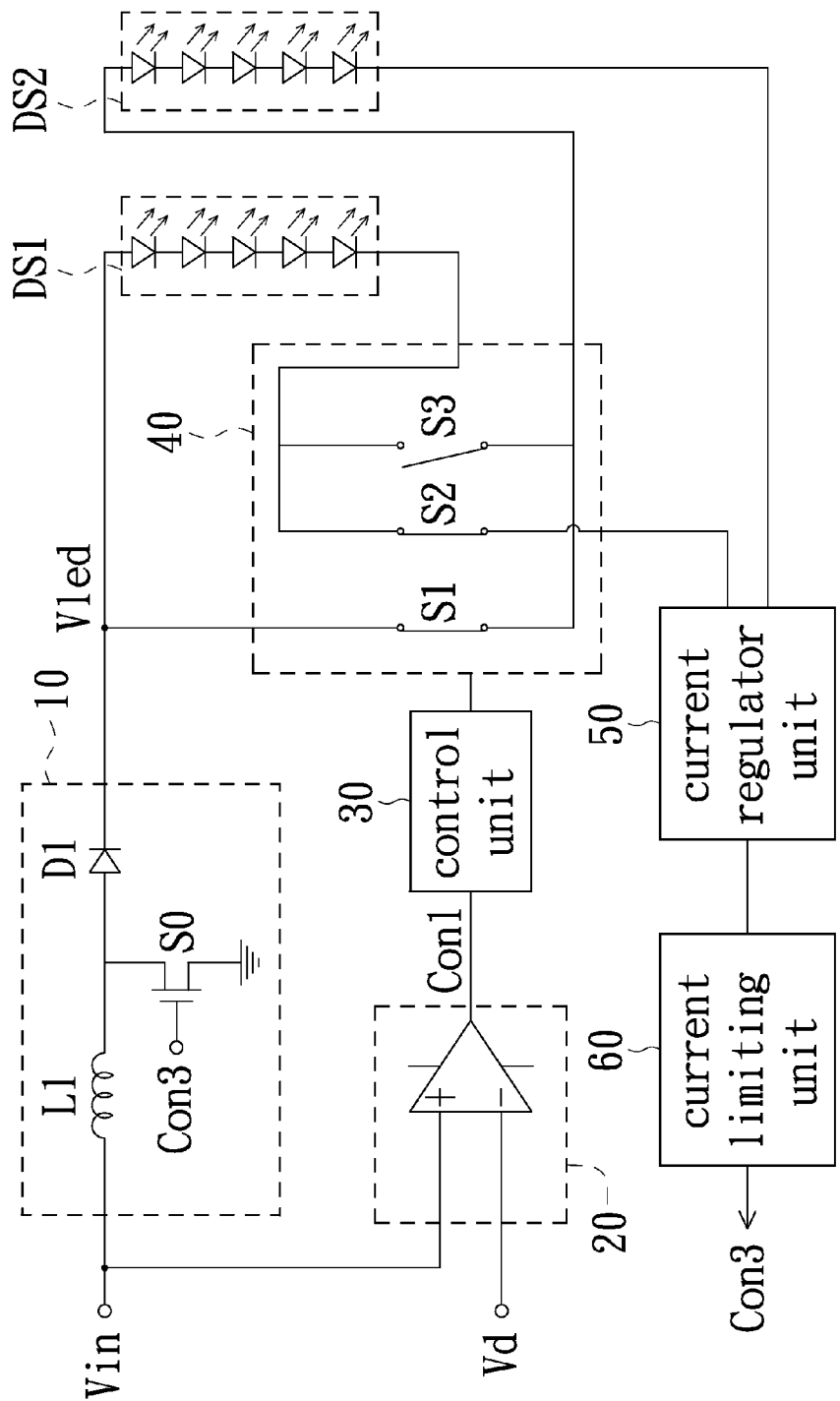
FIG. 2B is a schematic circuit view illustrating another exemplary operation of the switch unit shown in FIG. 1.

FIG. 2B is a schematic circuit view illustrating another exemplary operation of the switch unit 40 shown in FIG. 1. As shown, the comparison unit 20 outputs a logic-low first control signal Con1 to the control unit 30 if the input voltage Vin has a potential value smaller than that of the predetermined voltage Vd. Afterward, the control unit 30, according to the logic-low first control signal Con1, outputs a plurality of second control signals to the switch unit 40 and thereby turning on the switch elements S1, S2 and turning off the switch element S3.

Therefore, through configuring the negative terminal of the LED string DS1 electrically coupled to the current regulator unit 50 via the turned-on switch element S2, the positive terminal of the LED string DS1 electrically coupled to the second terminal of the diode D1, the positive terminal of the LED string DS2 electrically coupled to the second terminal of the diode D1 via the turned-on switch element S1, and the negative terminal of the LED string DS2 electrically coupled to the current regulator unit 50, accordingly a parallel loop is formed. In other words, the LED strings DS1, DS2 and the switch unit 40 herein corporately form a parallel loop. Thus, by dynamically modulating the circuit connection between the LED stings DS1, DS2 in response to the potential value of the input voltage Vin relative to the determined voltage Dd, and the LED string driving circuit in this embodiment of the present disclosure can have a higher power conversion efficiency and a lower power consumption consequently.

As illustrated in FIGS. 1, 2A and 2B, the LED string driving circuit in this embodiment is exemplified by including two LED strings DS1, DS2 only; however, it is understood that the LED string driving circuit may include more than two LED strings. In addition, if the LED strings include more than two (for example, four) LED strings, it is understood that the four LED strings can have various loop structures through the configurations of the switch unit 40. For example, these four LED strings corporately can form a series loop; or three LED strings corporately form a series loop and the remaining one LED string form a parallel loop; or two LED strings corporately form a series loop and the remaining two LED strings corporately form a parallel loop; or one LED string forms a series loop and the remaining three LED strings corporately form a parallel loop; or these four LED strings corporately form a parallel loop.

To sum up, when an input voltage Vin smaller the determined voltage Vd (for example, less than 15V) is supplied to the power supply unit 10 and thereby configuring the LED strings DS1, DS2 as well as the switch unit 40 with a specific circuit configuration to corporately form a parallel loop, the LED strings DS1, DS2 each can be individually driven by the relatively-low driving voltage Vled. Alternatively, when an input voltage Vin greater the determined voltage Vd (for example, greater than 15V) is supplied to the power supply unit 10 and thereby configuring the LED strings DS1, DS2 as well as the switch unit 40 with a specific circuit configuration to corporately form a series loop, the LED strings DS1, DS2 can be corporately driven by the relatively-high driving voltage Vled. In other words, even the input voltage Vin has a variation, both of the LED strings DS1, DS2 can be driven by a steady current and neither are turned off or bypassed, consequently the uneven luminosity issue is avoided. More specifically, through dynamically configuring the LED strings DS1, DS2 and the switch unit 40 to corporately form either a series loop or a parallel loop in response to variation of the input voltage Vin relative to the determined voltage Vd, the current flowing through the series-loop LED strings DS1, DS2 is approximately equal to the current flowing through the parallel-loop LED strings DS1, DS2; thus, in this embodiment the LED strings DS1, DS2 overall can have a steady luminosity without the effect of the varying input voltage Vin.

Figure 3A:
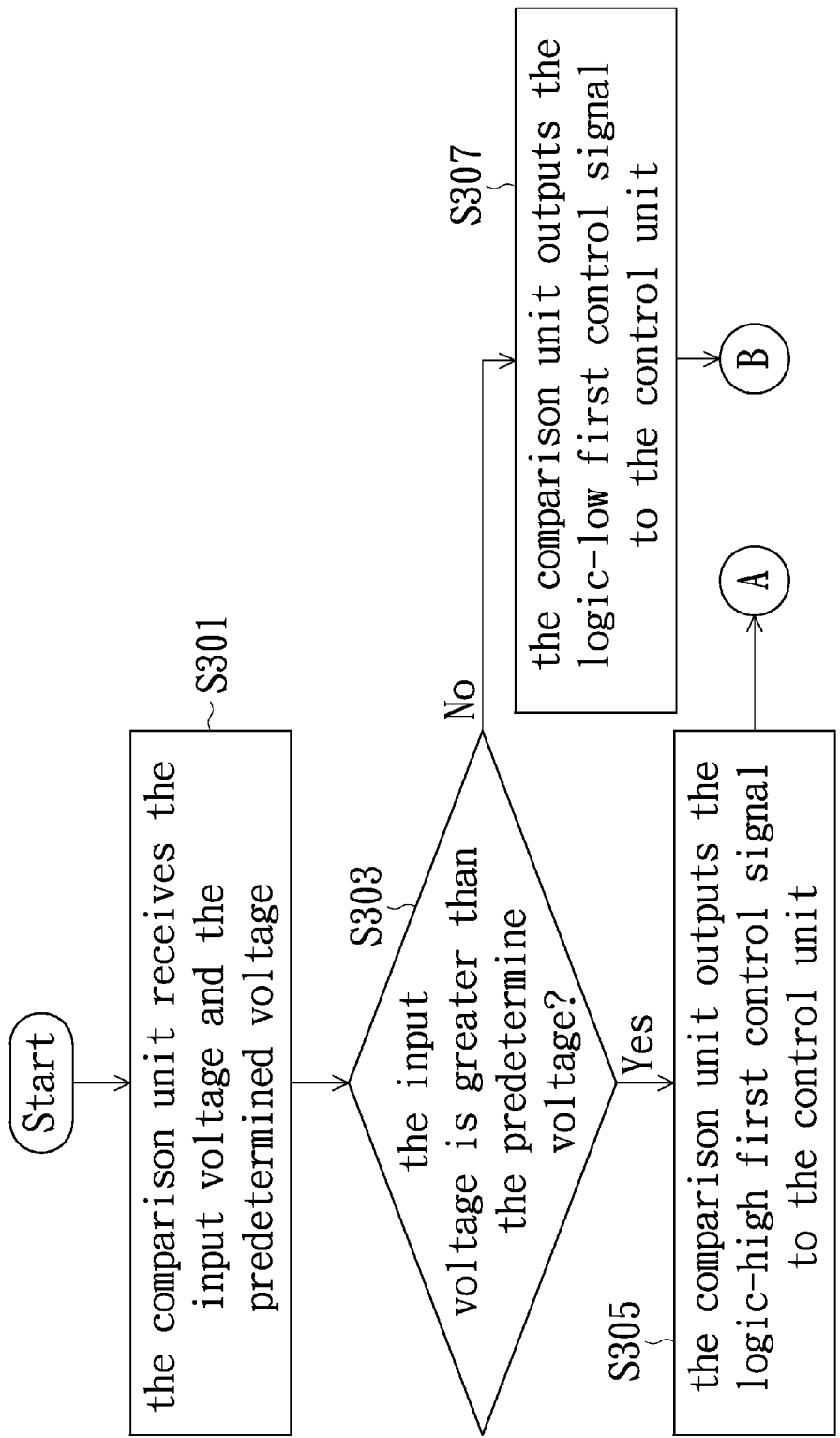
FIGS. 3A, 3B are schematic flow charts illustrating a LED string driving method in accordance with an embodiment of the present disclosure.
Figure 3B:
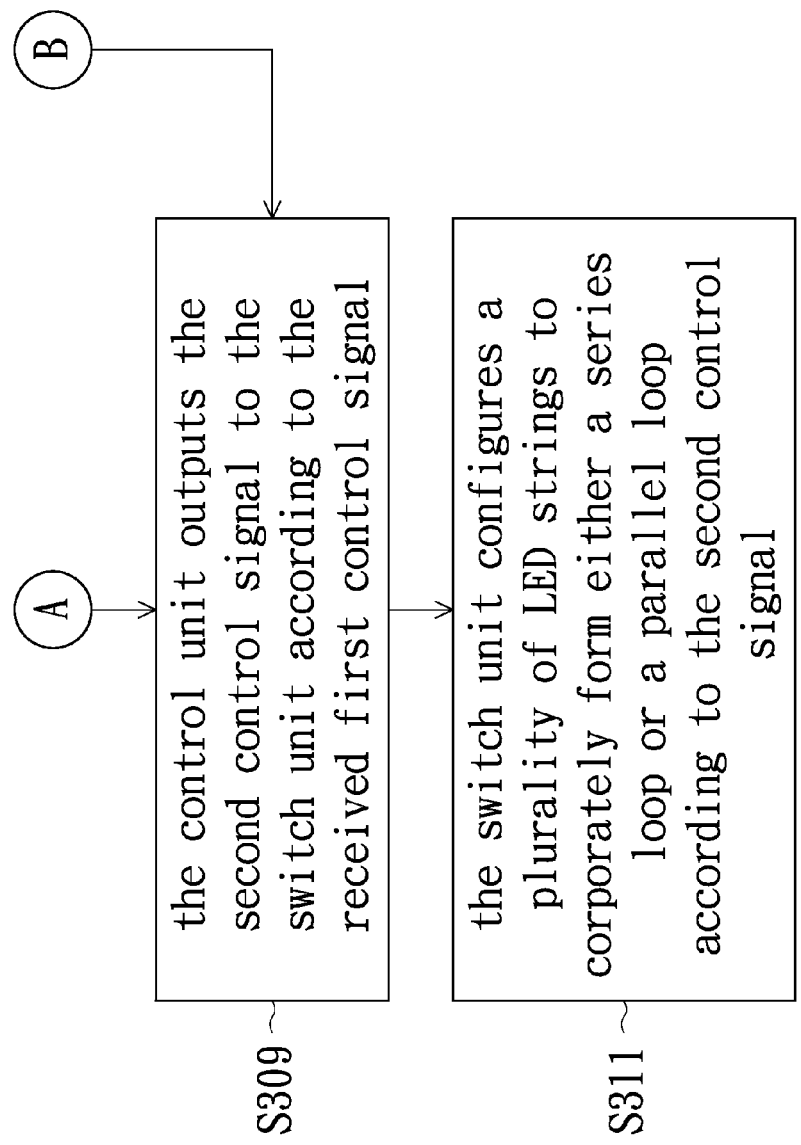

FIGS. 3A, 3B are schematic flow charts illustrating a LED string driving method in accordance with an embodiment of the present disclosure. Please refer to FIGS. 1, 3A and 3B. As shown, the comparison unit 20 is configured to have the first input terminal thereof for receiving the input voltage Vin and the second input terminal thereof for receiving the predetermined voltage Vd (step S301).

Next, the comparison unit 20 is configured to determine the input voltage Vin whether or not being greater than the determined voltage Vd by comparing the potential value thereof (step S303). Specifically, the comparison unit 20 outputs a logic-high first control signal Con1 to the control unit 30 if the input voltage Vin is greater than the determined voltage Vd (step S305); alternatively, the comparison unit 20 outputs a logic-low first control signal Con1 to the control unit 30 if the input voltage Vin is smaller than the determined voltage Vd (step S305). In addition, the comparison unit 20 may be configured not to output the first control signal Con1 if the input voltage Vin has a value equal to than that of the determined voltage Vd.

Afterwards, the control unit 30 outputs the second control signals to the switch unit 40 according to the received first control signal Con1 (step S309). Specifically, if the first control signal Con1 is logic high, the control unit 30 outputs a logic-low second control signal to both of the switch elements S1, S2 so as to turn off the two switch elements S1, S2 and outputs a logic-high second control signal to the switch element S3 so as to turn on the switch element S3; alternatively, if the first control signal Con1 is logic low, the control unit 30 outputs a logic-high second control signal to both of the switch elements S1, S2 so as to turn on the two switch elements S1, S2 and outputs a logic-low second control signal to the switch element S3 so as to turn off the switch element S3.

Afterwards, the switch unit 40 configures the LED strings DS1, DS2 to corporately form either a parallel loop or a series loop according to the logic level of the second control signal (step S311). For example, if the switch element S1, S2 and turned off the switch element S3 is turned on, the LED string DS1, DS1 corporately forms a series loop; alternatively, if the switch element S1, S2 and turned on the switch element S3 is turned off, the LED string DS1, DS1 corporately forms a parallel loop.

In summary, through dynamically modulating the connection configuration of a plurality of LED strings in response to the variation of an input voltage relative to a determined voltage Vd, the LED string driving circuit and a driving method thereof of the present disclosure can have improved power conversion efficiency.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A light emitting diode string driving circuit, comprising:
a plurality of light emitting diode (LED) strings;
a power supply unit electrically coupled to the LED strings and configured to receive an input voltage and accordingly output a driving voltage to the LED strings;
a comparison unit configured to receive the input voltage and output a first control signal according to a relationship between the input voltage and a predetermined voltage;
a control unit electrically coupled to the comparison unit and configured to receive the first control signal and generate a second control signal according to a potential level of the first control signal; and
a switch unit electrically coupled to the control unit, the power supply unit and the LED strings, the switch unit comprising a plurality of switch elements, the switch elements each being controlled by the second control signal and thereby forming various electrical loops,
wherein when the switch unit has one specific electrical loop and thereby configuring the LED strings corporately to form a parallel loop, the LED strings in the parallel loop are driven and controlled by the driving voltage; wherein when the switch unit has another specific electrical loop and thereby configuring the LED strings corporately to form a series loop, the LED strings in the series loop are driven and controlled by the driving voltage.

2. The light emitting diode string driving circuit according to claim 1, further comprising:
a current regulator unit electrically coupled to the switch unit and the LED stings and configured to maintain a current flowing through the LED strings at a fixed value.

3. The light emitting diode string driving circuit according to claim 2, wherein the LED strings comprise:
a first LED string having a positive terminal and a negative terminal, the first LED string being configured to have the positive terminal thereof electrically coupled to the power supply unit and the negative terminal thereof electrically coupled to the switch unit; and
a second LED string having a positive terminal and a negative terminal, the second LED string being configured to have the positive terminal thereof electrically coupled to the switch unit and the negative terminal thereof electrically coupled to the current regulator unit.

4. The light emitting diode string driving circuit according to claim 3, wherein the power supply unit comprises:
an inductor having a first terminal and a second terminal, the inductor being configured to have the first terminal thereof for receiving the input voltage;
a diode having a first terminal and a second terminal, the diode being configured to have the first terminal thereof electrically coupled to the second terminal of the inductor and the second terminal thereof electrically coupled to the switch unit and the positive terminal of the first LED string; and
a first switch element having a first terminal, a control terminal and a second terminal, the first switch element being configured to have the first terminal thereof electrically coupled to the first terminal of the diode and the second terminal thereof electrically coupled to ground.

5. The light emitting diode string driving circuit according to claim 4, wherein the switch unit comprises:
a second switch element having a first terminal, a control terminal and a second terminal, the second switch element being configured to have the first terminal thereof electrically coupled to the second terminal of the diode, the control terminal thereof electrically coupled to the control unit and the second terminal thereof electrically coupled to the positive terminal of the second LED string;
a third switch element having a first terminal, a control terminal and a second terminal, the third switch element being configured to have the first terminal thereof electrically coupled to the negative terminal of the first LED string, the control terminal thereof electrically coupled to the control unit and the second terminal thereof electrically coupled to the current regulator unit; and
a fourth switch element having a first terminal, a control terminal and a second terminal, the fourth switch element being configured have the first terminal thereof electrically coupled to the negative terminal of the first LED string, the control terminal thereof electrically coupled to the control unit and the second terminal thereof electrically coupled to the positive terminal of the second LED string.

6. The light emitting diode string driving circuit according to claim 1, wherein the comparison unit outputs a logic-high first control signal to the control unit if the input voltage has a potential value greater than that of the predetermined voltage; wherein the comparison unit outputs a logic-low first control signal to the control unit if the input voltage has a potential value smaller than that of the predetermined voltage.

7. The light emitting diode string driving circuit according to claim 1, wherein the LED strings corporate form the series loop via a specific electrical loop of the switch unit when the input voltage has a potential value greater than that of the predetermined voltage; wherein the LED strings corporate form the parallel loop via a specific electrical loop of the switch unit when the input voltage has a potential value smaller than that of the predetermined voltage.

8. The light emitting diode string driving circuit according to claim 1, wherein the current flowing through the series loop formed by the LED strings has a value equal to that flowing through the parallel loop formed by the LED strings.

9. A light emitting diode string driving circuit, comprising:
n number of light emitting diode (LED) strings;
a power supply unit electrically coupled to the LED strings and configured to receive an input voltage and accordingly output a driving voltage to the LED strings;
a comparison unit configured to receive the input voltage and output a first control signal according to a relationship between the input voltage and a predetermined voltage;
a control unit electrically coupled to the comparison unit and configured to receive the first control signal and generate a second control signal according to a potential level of the first control signal; and
a switch unit electrically coupled to the control unit, the power supply unit and the LED strings, the switch unit comprising a plurality of switch elements, the switch elements each being controlled by the second control signal and thereby forming various electrical loops,
wherein when the switch unit has one specific electrical loop and thereby configuring the p number of LED strings corporately to form a parallel loop and q number of LED strings corporately to form a series loop, the p number of LED strings in the parallel loop and the q number of LED strings in the series loop both are driven and controlled by the driving voltage; wherein (p+q)=n; p, q and n are integers equal to or greater than zero.

* * * * *